Feb. 16, 1960    H. R. DE TUNCQ    2,925,162
VESSEL FILLING APPARATUS
Filed Feb. 14, 1955
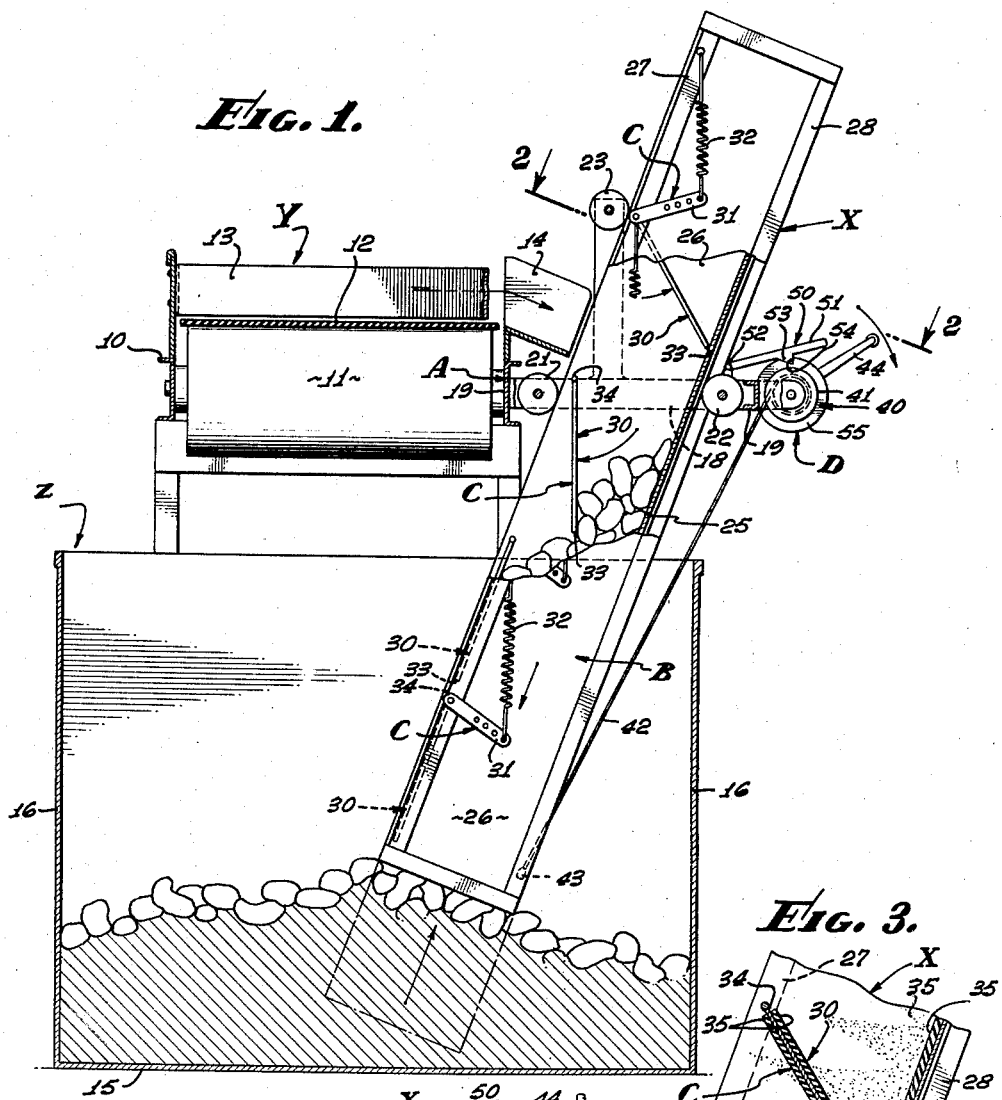
INVENTOR.
HAROLD R. DE TUNCQ
BY
Wm. H. Maxwell Jr.
AGENT.

United States Patent Office 2,925,162
Patented Feb. 16, 1960

2,925,162

VESSEL FILLING APPARATUS

Harold R. De Tuncq, Arvin, Calif.

Application February 14, 1955, Serial No. 487,757

3 Claims. (Cl. 193—7)

This invention relates to a vessel filling apparatus or loader and is more specifically concerned with a chute for handling materials such as vegetable produce or the like, whereby said material is gently handled during delivery to a storage vessel or container so that bruising of the material is eliminated.

It is a general object of the invention to provide a loading apparatus that gently handles materials such as vegetable produce or the like, without bruising or otherwise mutilating or damaging the said material.

An object of this invention is to provide a chute or guide for passing material into a vessel or container such as a bin, in a manner that eliminates damage to the material.

Another object of this invention is to provide a chute of the character referred to with means for limiting the falling distance of the material or objects handled by the chute whereby the material is not allowed to drop, in which case it would become bruised and damaged. Further, damage to the vessel receiving the material is eliminated since the pieces of material are checked in their fall.

It is still another object of this invention to provide a substantially vertically disposed chute of the character described that is movable vertically so that the lower end thereof does not become buried in the material delivered by the chute as the material fills the vessel or container.

A further object of this invention is to provide a chute of the character above referred to that is adapted to receive material through one side at any point between the upper and lower ends thereof. In the structure that I have provided the means for limiting the falling distance of material and objects handled by the chute is adapted to open and close the side of the chute receiving the material. The chute is alawys open to receive material and the said means closes the side of the chute only when the material passes through or fills the chute.

In the harvesting and storage phases of handling vegetable produce, damage often results from bruising caused by allowing the produce to fall or drop. For example, belt conveyors are used to move the produce and drop it onto other machines or into boxes, containers or bins. Though the produce first appears to be undamaged it is very often discovered at a later date that damage was incurred and that the produce is less valuable and sometimes worthless. Potatoes, for example, appear to be highly resistant to bruising, whereas in reality they are easily bruised during handling and are thereafter worthless for the purposes of cold storing. The bruised portions of the potatoes become rotten with the passing of relatively short periods of time when kept in cold storage. Therefore, it is highly important to handle produce such as potatoes and the like, with a degree of care which prevents bruising.

The various objects and features of my invention will be fully understood from the following detailed description of a typical preferred form and application of my invention, throughout which description reference is made to the accompanying drawings, in which:

Fig. 1 is a side elevation of the bin filling apparatus or loader that I have provided, showing the apparatus as it would appear in operation and showing portions thereof broken away to illustrate the working parts. Fig. 2 is an enlarged sectional view of a portion of the structure taken as indicated by line 2—2 in Fig. 1 and showing the padding which I have applied to the working parts of the apparatus, and Fig. 3 is a sectional view taken substantially as indicated by line 3—3 on Fig. 2.

The elements involved in the vessel filling apparatus or loader that I have provided are a material handling chute X, a material feeder Y and a storage bin Z. The chute X is an elongate substantially vertically disposed element rectangular in cross sectional configuration and open at one side.

The feeder Y may be a conveyor belt type mechanism involving a frame 10 carrying supporting rollers 11 that support the belt 12 of the conveyor. In the case illustrated, the frame 10 opens at the side of the conveyor and a deflector 13 extends diagonally across the belt 12 to move material handled by the belt to discharge it at one side thereof. A suitable lip 14 projects from the side of the conveyor and is pitched downwardly and outwardly so that material discharged onto the lip moves away from the conveyor, to discharge into the open side of the chute X.

The bin Z may be any suitable vessel or container and, as shown, has a bottom 15 and sides 16. The bin illustrated has substantial depth and is suitable for storing large quantities of material. It is to be understood that the bin Z may vary widely as circumstances require and that the apparatus of the present invention is equally useful for the filling of other types of containers such as bags and sacks, or the like.

The material handling chute X that I have provided is adapted to receive material from the feeder Y and to deliver said material into the bin Z and involves, generally, a supporting frame A, a material guide B, flow limiting means C and a guide shifting means D. The frame A is located at the feeder Y and shiftably supports the guide B so that it is substantially vertically disposed. The guide B is channel shaped, being open at one side thereof and normally depends from the frame A to enter into the bin Z. The guide shifting means D is provided to lift the guide B, as the bin Z is filled with material so that the lower end of the guide B can be maintained at or about the level of the material existing in the bin. The flow limiting means C acts to break or limit the fall of material in the guide B and operates to close the open side of the guide when material passes through or fills the guide.

The supporting frame A may vary in form and construction and, as illustrated, is an open construction fabricated of structural elements in the form of channels. As shown, the frame A shiftably supports the guide B and involves side members 18 tied together by spreaders 19 forming a rectangular frame with a substantial square opening 20. Guide rollers are carried by the frame on spaced parallel axes, there being a pair of rollers 21 at the front of the frame and a pair of rollers 22 at the back of the frame. The rollers 21 and 22 are located adjacent the spreaders 19 and are preferably parallel therewith. The rollers 21 and 22 are on horizontal axes and the rollers of each pair are spaced apart so that a roller occurs at each corner of the frame.

In accordance with this invention the guide B is preferably pitched downwardly and forwardly as clearly shown in Fig. 1 of the drawings, and an additional pair of guide rollers 23 is provided to hold the guide in said position. As shown, the rollers 23 are spaced apart and are on an axis spaced inwardly and upwardly from the axis of the front rollers 21. This positioning of the rollers 21, 22 and 23 holds the guide B hereinafter described, so that it is pitched or slanted from the vertical and so that it is shiftable on its longitudinal axis.

The material guide B that I have provided is adapted to receive material at or along one side thereof and to deliver said material from the lower end thereof. As shown in the drawings, the guide B is elongate and involves a back or bottom 25 and sides 26 that extend forwardly from the edges of the back 25 leaving the entire front of the guide B open to receive material. The guide B may be substantially square in cross sectional configuration and is provided at its corners with rails, there being a pair of front rails 27 and a pair of back rails 28. The front and back rails 27 and 28 are parallel with each other and extend longitudinally of the guide B and engage with the rollers 21 and 22, respectively. The rollers 23 also engage the guide B at the front rails 27 to maintain the guide pitched or inclined from the vertical axis as above described.

The guide B is completely open at the top and bottom and along the entire front side thereof so that material can enter the guide at any point along the front thereof to fall by action of gravity and to be delivered from the lower end of the guide. The guide B is also free to be moved or shifted upwardly and downwardly in the frame A so that the lower end of the guide can be lifted during filling of the bin Z or like vessel.

The flow limiting means C is provided to halt excessive falling of objects or material handled by the guide B, and is characterized by a series of panels 30 that obstruct the channel formed by the back and side walls 25 and 26 and which are adapted to swing downwardly and forwardly to close the front of the guide B. The panels 30 are located along the guide B at equally spaced intervals and are pivotally carried on horizontal axes at the front of the guide. Each panel 30 is substantially rectangular in cross section and somewhat larger in area than the cross sectional area of the guide B and, as shown, normally extends downwardly and rearwardly within the guide B where it engages the bottom 25 to close the channel formed by the guide. The panel 30 is held in the closed position by means of a lever 31 and spring 32, or the like, that yieldingly urge the panel rearwardly and upwardly. It will be readily apparent from the drawings how the spring 32 may be engaged in suitable openings along the arms 31 to allow the panel to drop upon the application of the desired amount of pressure. When in the fully down or extended position the lower edge 33 of the panel 30 is adjacent to the upper edge 34 of the next lower panel 30 thereby closing the front side of the guide B so that the guide is, in effect, a tubular or duct-like element.

As illustrated in Fig. 3 of the drawings, the back 25 and sides 26 and panels 30 may be lined with padding 35 which may be sheet rubber, or the like. The padding 35 presents soft surfaces upon which objects or material impinge thereby minimizing the possibility of bruising.

The guide shifting means D may vary widely as circumstances require and is shown as a simple winch and cable unit 40. The unit 40 involves a winch drum 41 carried on an axis that extends between the side members 18 of the frame at the back thereof and a lifting cable 42 carried on the drum and connected to the lower end of the guide B at 43. In practice, the diameter of the drum 41 is preferably such that the guide B is lifted one level at a time, that is, so that the feeder means C is successively brought to or by the feeder Y. For example, the ratio of the cable 42 as it winds onto the drum 41 may be such that two even turns of the crank are required to lift or lower the guide B one step or level. When the winch and cable unit 40 is operated the drum 41 is rotated by turning of a crank 44 so that the cable 42 winds onto the drum 41 thereby lifting the guide B relative to the frame A.

The guide shifting means D also includes a stop or positioning means 50 provided to hold the guide B supported at any desired level. As shown, the means 50 may involve a manually operable lever 51 that is pivotally carried on a pin 52 and which carries a dog 53. The dog 53 is engageable in a notch 54 in the drum 41 or a part related thereto. In the case illustrated, the dog 53 engages in a notch 54 provided in a plate or disc 55 laterally offset from the drum 41 and carried on a common shaft.

From the foregoing it will be apparent that I have provided an extremely simple and effective filling or loading apparatus adapted to be applied to a variety of situations and to be used to handle a wide variety of materials. As material is fed into the side of the guide B it is a simple matter to operate the shifting means D so that the lower end of the guide is maintained at the level of material in the vessel being filled. It will be apparent that as the material is fed into the side of the chute that I have provided, the individual pieces of material will fall only a short distance whereupon their fall is checked or stopped by a panel 30 which then opens allowing the piece of material to drop or fall to the next panel, and so on. It will also be apparent that when the guide B is filled with material and all of the panels are opened as indicated at the lower end thereof in the drawings, the guide is, in effect, a tubular structure that directs the flow of material to the bin or vessel.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. Vessel filling apparatus of the character described including, a frame having guide means, an elongate substantially vertically disposed guide having a back and sides extending from the back and shiftably carried by the frame and guided by said guide means and forming a forwardly opening channel, flow limiting means in the guide and including, a flat panel extending between and pivoted to the sides at the front of the guide and yieldingly urged to a position engaging the back thereby closing the channel, and operable to a position closing the front of the guide so that the guide becomes a tubular duct, and means shifting the guide longitudinally and relative to the frame.

2. Vessel filling apparatus of the character described including, a frame having guide rollers, an elongate substantially vertically disposed guide having a back and sides extending from the back and shiftably carried by the frame and guided by the rollers and forming a forwardly opening channel, flow limiting means in the guide and including, a flat panel extending between and pivoted to the sides at the front of the guide and yieldingly urged to a position engaging the back thereby closing the channel and operable to a position closing the front of the guide so that the guide becomes a tubular duct, and means shifting the guide longitudinally and relative to the frame.

3. Vessel filling apparatus of the character described including, a frame having guide rollers, an elongate substantially vertically disposed guide having a back and sides extending from the back and shiftably carried by the frame and guided by the rollers and forming a forwardly opening channel, flow limiting means in the guide and including, a series of flat panels extending between and pivoted to the sides along the front of the guide, and each yieldingly urged to a position engaging the back thereby closing the channel and operable to a position closing the front of the guide so that the guide becomes a tubular duct, and means shifting the guide longitudinally and relative to the frame.

References Cited in the file of this patent

UNITED STATES PATENTS

| | | |
|---|---|---|
| 473,143 | Coze | Apr. 19, 1892 |
| 592,133 | Davis | Oct. 19, 1897 |
| 638,832 | Carlton | Dec. 12, 1899 |
| 1,114,318 | Vasey | Oct. 20, 1914 |
| 1,951,703 | Morison et al. | Mar. 20, 1934 |

FOREIGN PATENTS

| | | |
|---|---|---|
| 277,818 | Great Britain | Sept. 29, 1927 |
| 444,116 | Great Britain | Mar. 16, 1936 |
| 803,311 | France | June 29, 1936 |